(12) United States Patent
Philippov et al.

(10) Patent No.: US 10,964,228 B2
(45) Date of Patent: Mar. 30, 2021

(54) EDUCATIONAL SYSTEM, METHOD, COMPUTER PROGRAM PRODUCT AND KIT OF PARTS

(71) Applicant: MEL SCIENCE LIMITED, Buckinghamshire (GB)

(72) Inventors: Vassili Philippov, Buckinghamshire (GB); Artem Messorosh, Buckinghamshire (GB); Sergey Safonov, Buckinghamshire (GB); Mikhail Perepelkin, Buckinghamshire (GB); Konstantin Gurianov, Buckinghamshire (GB)

(73) Assignee: MEL SCIENCE LIMITED, Little Chalfont (GB)

( * ) Notice: Subject to any disclaimer, the term of this patent is extended or adjusted under 35 U.S.C. 154(b) by 165 days.

(21) Appl. No.: 15/557,576

(22) PCT Filed: Mar. 9, 2016

(86) PCT No.: PCT/GB2016/050641
§ 371 (c)(1),
(2) Date: Sep. 12, 2017

(87) PCT Pub. No.: WO2016/142706
PCT Pub. Date: Sep. 15, 2016

(65) Prior Publication Data
US 2018/0053439 A1 Feb. 22, 2018

(30) Foreign Application Priority Data

Mar. 12, 2015 (GB) .................................... 1504170

(51) Int. Cl.
*G09B 19/00* (2006.01)
*G09B 5/06* (2006.01)
(Continued)

(52) U.S. Cl.
CPC ......... *G09B 19/00* (2013.01); *G06K 9/00671* (2013.01); *G06T 19/006* (2013.01); *G09B 5/065* (2013.01); *H04B 5/0056* (2013.01)

(58) Field of Classification Search
CPC ................................ G09B 19/00; G09B 5/065
(Continued)

(56) References Cited

U.S. PATENT DOCUMENTS 5,813,865 A * 9/1998 Greenbowe ........ G09B 19/0069
345/473
6,135,776 A * 10/2000 Erturk ...................... G09B 7/02
434/118

(Continued)

FOREIGN PATENT DOCUMENTS

GB 2319111 A 5/1998
GB 2319111 B 12/2000

OTHER PUBLICATIONS

International Search Report, dated Jul. 22, 2016, issued in international Application No. PCT/GB2016/050641.

*Primary Examiner* — David L Lewis
*Assistant Examiner* — Shauna-Kay Hall
(74) *Attorney, Agent, or Firm* — Saul Ewing Arnstein & Lehr LLP

(57) ABSTRACT

There is disclosed an educational system including a science experimental set and a computer system, the science experimental set comprising experimental set items, and the computer system including a processor, a detector and a display, the computer system configured to display educational media content on the display relating to the science experimental set in response to the detector detecting an item in the science experimental set, and the processor identifying the (Continued)

media content to be displayed based on the detection of the item. Related methods, computer program products and kits of parts are disclosed.

19 Claims, 9 Drawing Sheets

(51) Int. Cl.
*G06K 9/00* (2006.01)
*G06T 19/00* (2011.01)
*H04B 5/00* (2006.01)

(58) Field of Classification Search
USPC .......................................................... 434/262
See application file for complete search history.

(56) References Cited

U.S. PATENT DOCUMENTS

| | | | |
|---|---|---|---|
| 6,261,103 B1 * | 7/2001 | Stephens | G09B 5/14 434/118 |
| 6,549,751 B1 * | 4/2003 | Mandri | G09B 5/00 434/118 |
| 6,813,473 B1 * | 11/2004 | Bruker | G09B 7/02 434/118 |
| 2009/0271715 A1 * | 10/2009 | Tumuluri | G06T 17/005 715/757 |
| 2011/0021180 A1 | 1/2011 | Ray | |
| 2013/0212453 A1 | 8/2013 | Gudai et al. | |
| 2013/0278777 A1 | 10/2013 | Sweet, III et al. | |
| 2014/0080129 A1 * | 3/2014 | Klunder | C12Q 1/68 435/6.12 |
| 2014/0267240 A1 | 9/2014 | Smith | |
| 2014/0349257 A1 | 11/2014 | Connor | |

* cited by examiner

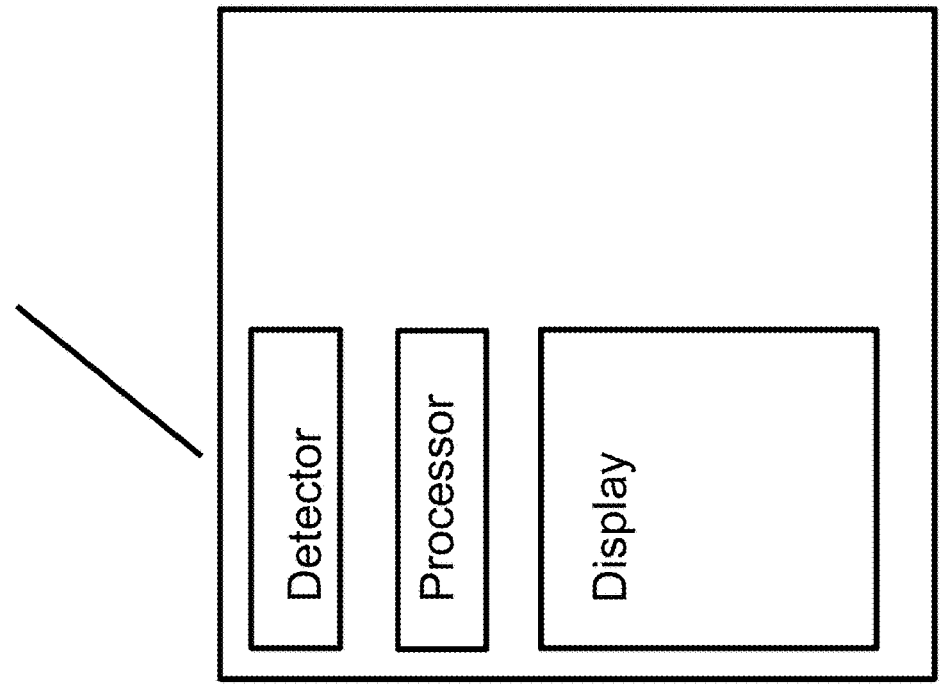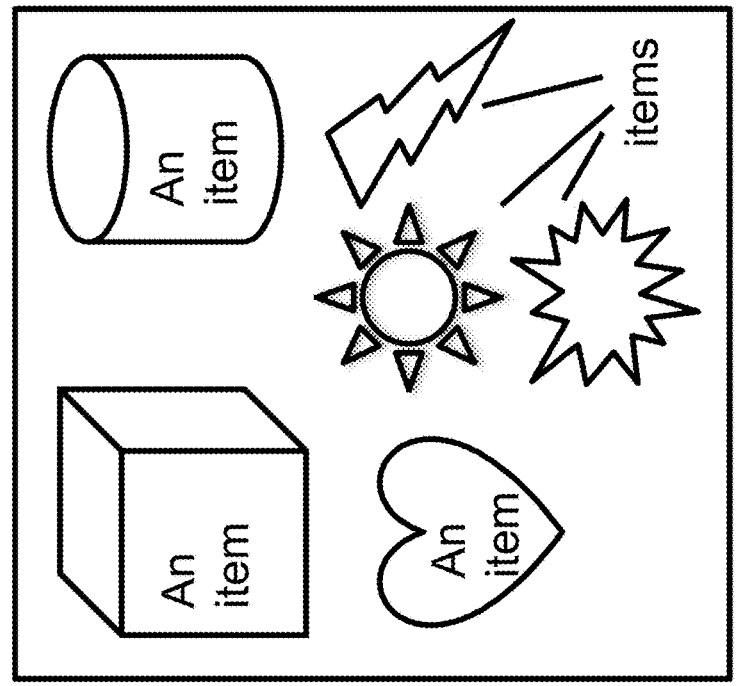
FIGURE 7

EDUCATIONAL SYSTEM, METHOD, COMPUTER PROGRAM PRODUCT AND KIT OF PARTS

CROSS REFERENCE TO RELATED APPLICATIONS

This application claims the priority of PCT/GB2016/050641, filed on Mar. 9, 2016, which claims the benefit of priority to Great Britain Application No. GB 1504170.0, filed on Mar. 12, 2015, the entire contents of which are fully incorporated herein by reference.

BACKGROUND OF THE INVENTION

1. Field of the Invention

The field of the invention relates to educational systems, and to related methods, computer program products and kits of parts. The field of the invention also relates to defocus code systems, and to related methods, computer program products and kits of parts.

2. Technical Background

Chemistry experimental sets (also known as "chemistry sets" or "chemistry kits") are products that are used by children and adults to perform chemistry experiments. They typically include chemistry reagents, test tubes, flasks, and other labware and instructions. A chemistry set is an educational apparatus allowing the user (typically a teenager) to perform chemistry experiments, typically simple chemistry experiments.

A chemistry set typically includes equipment and chemicals. Typical equipment would include some or all of: wires or filings of various metals, such as copper, nickel or zinc; graphite rods; a balance and weights; a measuring cylinder, a thermometer, a magnifying glass; pipettes; beakers, retorts, flasks, test tubes, U-tubes or other reaction vessels; cork stoppers; watch glasses; glass and rubber tubing; test tube holders, retort stands and clamps; an alcohol burner or other heat source; a filter funnel and filter paper, universal indicator paper or litmus paper, safety goggles, and an instruction manual. Chemistry set chemicals may include some or all of: CaO, copper sulfate, magnesium ribbon, powdered iron, sulfur, zinc sulfate, for example. The chemicals in the chemistry set may be supplemented by readily available household chemicals eg. vinegar, citric acid (eg. in lemons), sodium bicarbonate (baking soda), sodium chloride (table salt).

Chemistry sets have been on sale since at least the early 20$^{th}$ century.

3. Discussion of Related Art

GB2319111(A) and GB2319111(B) disclose an educational chemistry set including a three dimensional moulded plastic base member 10 having an upper surface which is horizontal in use, two sets of cylindrical experiment wells 12, 13 which are open to said upper surface and directly in which solid and liquid chemicals may be stored and mixed, with the diameters of a first of the two sets of experiment wells 12 being the same and greater than those 13 of the second set, closure members which are releasably locatable in the open mouths of the experiment wells 12, 13 and means on at least some of the closure members for use in chemical experiments. The means may take the form of an open fluid passage way which passes through the closure member, or electrical leads and a light source. The set may also include test tubes, support stand and a set of spatulas. Prior art FIG. 3 is disclosed in GB2319111(A) and GB2319111(B).

One of the problems of the existing chemistry experimental sets is that people who use them often do not understand the chemistry behind the experiments. Instructions with texts and static pictures are limited in their ability to explain these things. It is desirable to provide a way for people using chemistry sets to better understand the chemistry behind the experiments.

More generally, one of the problems of science experimental sets may be that people who use them often do not understand the science behind the experiments. Instructions with texts and static pictures are limited in their ability to explain these things. It is desirable to provide a way for people using science experimental sets to better understand the science behind the experiments.

SUMMARY OF THE INVENTION

According to a first aspect of the invention, best illustrated with respect to FIG. 7, there is provided an educational system including a science experimental set 701 and a computer system 703, the science experimental set comprising experimental set items, and the computer system including a processor, a detector and a display, the computer system configured to display educational media content on the display relating to the science experimental set in response to the detector detecting an item in the science experimental set, and the processor identifying the media content to be displayed based on the detection of the item. An advantage is that a user can very easily access specific media content relating to specific aspects of the experimental set. An advantage is that the education of the user is thereby improved. An advantage is that users find it easier to persist with working with the experimental set, because they can understand the experiments and do not become disillusioned because they understand too little about the experiments. Media content may be stored in the computer system, or media content may be stored outside the computer system.

The educational system may be one wherein the science is chemistry, physics, biology or medicine.

The educational system may be one wherein the detector includes a camera, and wherein the detecting includes recording an image relating to the item. An advantage is that it is easy for a user to point a camera at an item, and thereby obtain media content in relation to the item.

The educational system may be one wherein the detector includes a plurality of cameras, and wherein the detecting includes using the cameras to detect the item. An advantage is that a plurality of cameras provide improved reliability of detection of the item.

The educational system may be one wherein the detecting includes identifying a symbol, code, or a computer recognizable label, on the item.

The educational system may be one wherein the detecting includes detecting the item itself using image recognition algorithms.

The educational system may be one wherein the detector includes a wireless detector, and wherein the detecting includes detecting a wireless signal from the item. An advantage is that it is easy for a user to bring a wireless detector near to an item, and thereby obtain media content in relation to the item. A further advantage is that it is easier for blind people to use.

The educational system may be one wherein the wireless detector is a near field scanner or an ultra high frequency radio frequency identification detector.

The educational system may be one wherein the media content is one or more of: text, graphics, video, audio, animation or pictures.

The educational system may be one wherein the video media content is an experiment video.

The educational system may be one wherein the media content provides one or more of the following features:
 Visualization of a molecule's 3D structure;
 Showing molecular structure using different models ("balls and sticks", "balls", etc.);
 Allowing to rotate, zoom in/zoom out to explore the molecule structures;
 Visualization of molecular dynamics;
 Visualization of the change of different parameters during the reaction using graphs and charts;
 Visualization of electron orbitals in the atom and molecules;
 Controlling reaction visualization speed and scale;
 Controlling controllable devices included in the science experimental set (eg. controlling the temperature of a heater, controlling to open a valve to let a liquid flow through the valve);
 Read information from the measurement devices included in the science experimental set (e.g. scales, thermometer, etc.) and present this information in a visual way.

The educational system may be one wherein the media content provides a dynamic experiment description.

The educational system may be one wherein the item is a user manual, an experiment description, experiment instructions, an experiment photo or a science experimental set box.

The educational system may be one wherein the item is a static experiment description, and in which the media content is a dynamic experiment description.

The educational system may be one wherein the computer system includes a portable device.

The educational system may be one wherein the computer system includes a smartphone, tablet computer, laptop computer, desktop computer or a TV computer.

The educational system may be one wherein the computer system includes an augmented reality system including a headset including the display.

The educational system may be one using augmented reality technology to recognize one or several reagent containers in a video stream and add additional information about the reagent or reagents directly to the video, which is displayed on the display.

The educational system may be one wherein the additional information is one or more of:
 Chemical formula;
 Molecule 3D structure;
 Crystal structure;
 Some text data including parameters such as the reagent mass, density, melting point, etc.

The educational system may be one wherein the science is chemistry and the item is a reagent container.

The educational system may be one wherein the computer system shows on the display the molecular structure of the reagent.

The educational system may be one wherein a software application running on the processor first shows a reagent container and then zooms in on it to show the molecules; such an effect helps a user to understand that the shown molecule is actually what is inside the reagent.

The educational system may be one wherein a software application running on the processor is preinstalled to the computer system, or is downloadable to the computer system.

The educational system may be one including any aspect of the fifth aspect of the invention.

According to a second aspect of the invention, there is provided a kit of parts comprising a science experimental set and a software application, the science experimental set comprising experimental set items, the software application executable on a computer system, the computer system including a processor, a detector and a display, the computer system operable to execute the software application on the processor to display educational media content on the display relating to the science experimental set in response to the software application executing on the processor detecting an item in the science experimental set, and the software application executing on the processor identifying the media content to be displayed based on the detection of the item.

The kit of parts may be configurable to form an educational system of any aspect of the first aspect of the invention.

According to a third aspect of the invention, there is provided a method of displaying educational media content on a display, the educational media content relating to a science experimental set, the method comprising the steps of:
(i) a detector detecting an item in the science experimental set;
(ii) a processor identifying the educational media content to be displayed based on the detection of the item, and
(iii) a computer system displaying the educational media content on the display, the educational media content relating to the science experimental set, in response to the detector having detected the item in the science experimental set.

The method may be one which is performed using an educational system of any aspect of the first aspect of the invention, or performed using a kit of parts of any aspect of the second aspect of the invention.

According to a fourth aspect of the invention, there is provided a computer program product executable on a processor of a computer system including the processor, a display and a detector, the computer program product executable on the processor of the computer system to:
(i) detect using the detector an item in a science experimental set;
(ii) identify educational media content to be displayed based on the detection of the item, and
(iii) display on the display the educational media content, the educational media content relating to the science experimental set, in response to the detection of the item in the science experimental set.

The computer program product may be configured to perform a method of any aspect of the third aspect of the invention.

According to a fifth aspect of the invention, there is provided a defocus code system, comprising printed code and a computer system including a camera and a processor, and software executable on the processor, the processor executing the software to use the camera to read the code that can be read when the camera is not focused on the code, wherein the code contains less than 20 bytes of information. An advantage is that the code can still be read, even if the code is not in focus as viewed by the camera.

The defocus code system may be one wherein the printed code comprises spots of easy to distinguish colors wherein such spots are large enough that the color is recognized even if an image of the spots obtained by the camera is not in focus. An advantage is that the code can still be read, even if the code is not in focus as viewed by the camera.

The defocus code system may be one wherein the spots are exactly or approximately circular spots. An advantage is that such spots typically keep approximately the same shape when out of focus.

The defocus code system may be one wherein the printed code includes an orientation symbol. An advantage is that the correct orientation can be uniquely determined.

The defocus code system may be one wherein the printed code includes an error checking code. An advantage is that a code can be rejected if the error checking finds an error. An advantage is improved robustness against soiling of the code.

The defocus code system may be one wherein the code contains less than 15 bytes of information, or wherein the code contains less than 10 bytes of information, or wherein the code contains less than 8 bytes of information, or wherein the code contains less than 6 bytes of information, or wherein the code contains less than 4 bytes of information, or wherein the code contains less than 2 bytes of information. An advantage is that even small amounts of data can be encoded and read.

According to a sixth aspect of the invention, there is provided a kit of parts including printed code and a computer program product executable on a processor of a computer system, the computer system including a camera and the processor, wherein the software is executable by the processor to use the camera to read the code that can be read when the camera is not focused on the code, wherein the code contains less than 20 bytes of information.

The kit of parts may be configurable to form a defocus code system of any aspect of the fifth aspect of the invention.

According to a seventh aspect of the invention, there is provided a method of reading a printed code that is not in focus, the method comprising the steps of
(i) a processor of a computer system executing software to use a camera of the computer system to read the code that can be read when the camera is not focused on the code, wherein the code contains less than 20 bytes of information.

The method may be performed using a defocus code system of any aspect of the fifth aspect of the invention, or performed using a kit of parts of any aspect of the sixth aspect of the invention.

According to an eighth aspect of the invention, there is provided a computer program product executable on a processor of a computer system including the processor and a camera, the computer program product executable on the processor of the computer system to:
(i) use the camera of the computer system to read the code that can be read when the camera is not focused on the code, wherein the code contains less than 20 bytes of information.

The computer program product may be configured to perform a method of any aspect of the seventh aspect of the invention.

Further aspects of the invention are provided in the claims. Aspects of the invention may be combined, as would be understood by one skilled in the art.

BRIEF DESCRIPTION OF THE FIGURES

Aspects of the invention will now be described, by way of example(s), with reference to the following Figures, in which.

DETAILED DESCRIPTION

Figure 1:
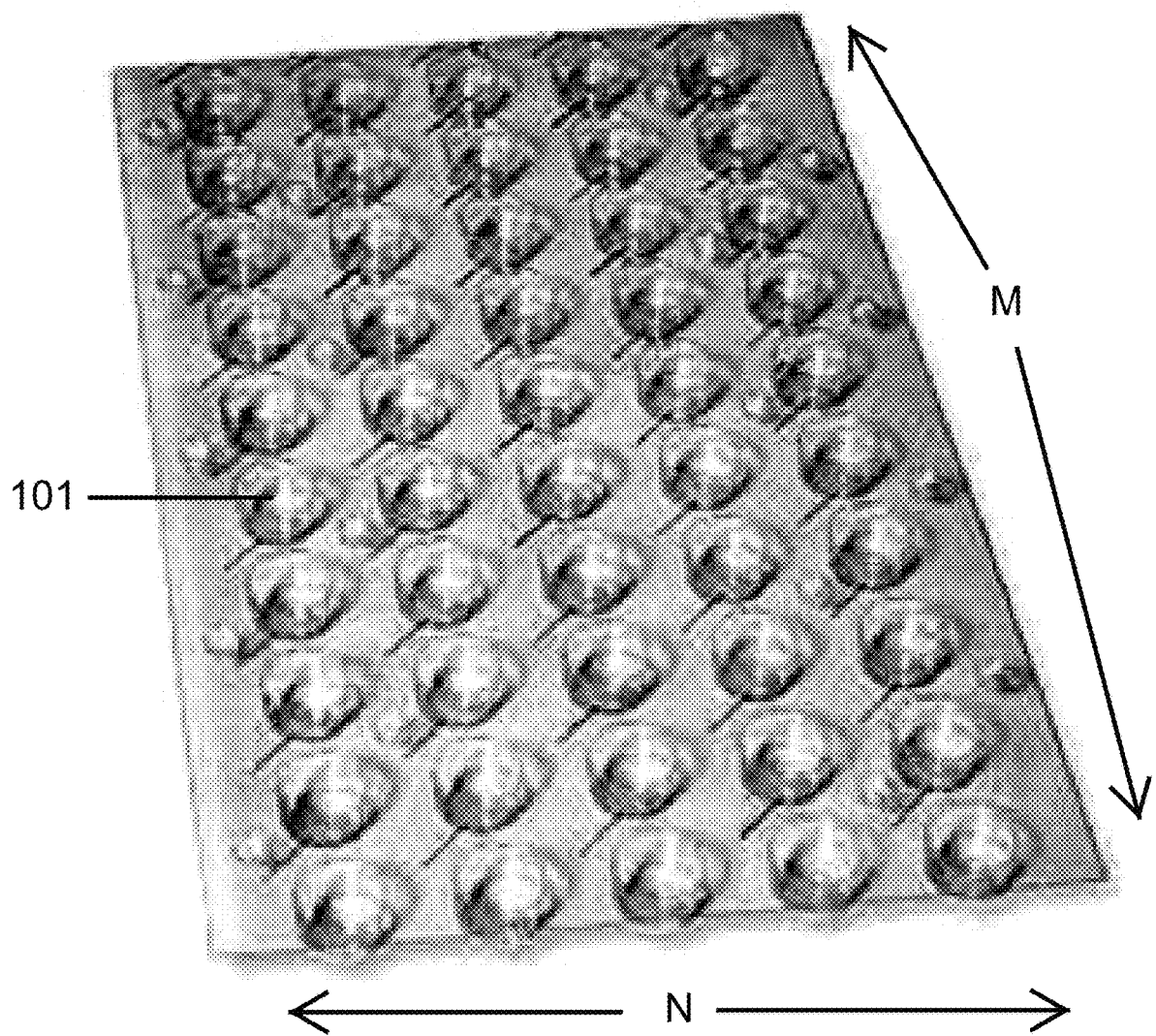
FIG. 1 shows an example of a special container that includes a matrix of N*M holes.

There follows a description which relates, at least in part, to various improvements to chemistry experimental sets and to science experimental sets.

1. Chemistry Experimental Sets with Software (eg. An App)

There is provided a chemistry experimental set with software, eg. software for a computer including a display (eg. smartphones, tablets, or PC), in which the software, when running on a computer, helps to visualize molecules and to simulate chemical reactions.

One of the problems of the existing chemistry experimental sets is that people who use them may not understand the chemistry behind the experiments. Instructions with texts and static pictures are limited in their ability to explain these things. An interactive app, eg. running on a computer including a display, gives much more freedom to visualize the chemistry and physical processes on the molecular level. Therefore, creating a chemistry experimental set with a companion software application offers new ways to explain the science.

The software application, when running on a computer, could include, among other things, the following features:
Visualization of a molecule's 3D structure
Showing molecular structure using different models ("balls and sticks", "balls", etc.)
Allowing to rotate, zoom in/zoom out to explore the molecule structures in a better way
Visualization of molecular dynamics
Visualization of the change of different parameters during the reaction using graphs and charts
Visualization of electron orbitals in the atom and molecules
Controlling reaction visualization speed and scale
Controlling controllable devices included in the chemistry experimental set (eg. controlling the temperature of a heater, controlling to open a valve to let a liquid flow through the valve).

Read information from the measurement devices included in the chemistry experimental sets (e.g. scales, thermometer, etc.) and present this information in a visual way.

The application may be configured to work on various different computer devices, such as smartphones, tablet devices, PCs, laptops, and TV sets, for example. The user can be offered or permitted to install the application on his/her computer device or the chemistry experimental set could include a computer device with an already preinstalled application, for example.

2. Point to Visualize App

There is provided a chemistry experimental set with software that, when running on a computer system including a camera and a display, reads by the camera a special symbol on a reagent container, or another computer recognizable label, in which the software running on the computer system shows on the display the molecular structure of the reagent.

There is provided a chemistry experimental set with software that, when running on a computer system including a display, uses a near field scanner (NFS) to identify a reagent container, or uses another computer recognizable label, in which the software running on the computer system shows on the display the molecular structure of the reagent.

An idea of the application is to help users understand the internal molecular structure of the reagents that they are using in the simplest way—instead of choosing which molecule to visualize from a list, the user can just point the device with the installed application to the physical reagent container and the application will recognize the reagent and show the corresponding information.

There are several ways such behavior can be achieved:
The application uses one of the device's cameras (or all of them simultaneously) to read a special code that is written on the reagent container.
The application uses one of device cameras (or all of them simultaneously) to recognize the container photo without using a special code but rather using image recognition algorithms.
The application uses Near field communication (NFC), Ultra high frequency Radio-frequency identification (UHF RFID) or other wireless detectors to recognize the container reagent.
The application can also use augmented reality technology to recognize one or several container reagents in the video stream and add additional information about the reagents directly to the video. Such additional information could be:
Chemical formula
Molecule 3D structure
Crystal structure
Some text data including parameters such as the reagent mass, density, melting point, etc.

As an option, the application can first show the reagent container and then zoom in on it to show the molecules. Such an effect helps the user to understand that the shown molecule is actually what is inside the reagent.

Such an application can either be preinstalled to a device that comes as a part of a chemistry experimental set, or be suggested or permitted to be installed by the end user on his/her device.

3. Point to Video App

There is provided a chemistry experimental set with software running on a computer system including a camera and a display, that reads a special symbol by the camera on experiment instructions or another computer recognizable label and starts playing an experiment video on the display.

There is provided a chemistry experimental set with software running on a computer system including a display, that reads an identifier using NFS or another computer recognizable label on experiment instructions and starts playing an experiment video on the display.

Each experiment could be described either using static (eg. text and pictures) or dynamic (eg. video and interactive animation) information. We suggest linking them by allowing the user to point his/her device, which may include a camera, (such as a smartphone/tablet/laptop/PC/TV Set/etc.) to a static experiment description (eg. in a user manual) and get a dynamic experiment description, eg. on a display.

For example, there could be provided an application that is installed on a device including a camera and a display, in which the user points the camera at an experiment photo and the photo is animated as an experiment video displayed on the device display.

There are several ways such a behavior can be achieved:
The application uses one of the device's cameras (or all of them simultaneously) to read a special code that is written on an experiment photo or in another place where the experiment is mentioned (eg. on a box, in instructions, etc.)
The application uses one of the device's cameras (or all of them simultaneously) to recognize an experiment photo or experiment box without using a special code but rather using image recognition algorithms.
The application uses Near field communication (NFC), Ultra high frequency Radio-frequency identification (UHF RFID) or other wireless detectors to recognize an experiment.
The application can also use augmented reality technology to recognize an experiment photo in the video stream obtained from a camera, and provide animation by showing a video of the experiment on a display.

Such an application can either be preinstalled on a device that comes as a part of a chemistry experimental set or be suggested or permitted to be installed by an end user on his/her device.

4. Chemistry Experimental Set as a Subscription

There is provided a chemistry experimental set that is split into small subsets with a few experiments in each, in which the subsets are sent by a delivery service eg. by post eg. on a regular basis.

One of the problems of the existing chemistry experimental sets is that after playing several times with them, users forget about them. So only a few of the included experiments may be used by the user.

We suggest solving this problem by making a chemistry experimental set as a service. When a user subscribes, they get some initial set and then receive additional chemistry experimental sets by a delivery service eg. by post eg. on a regular basis, or by demand.

5. Chemistry Experimental Set with Additional Reagents in One Online Purchase

A website that can sell a chemistry experimental set and additional reagents that are not allowed to be included in the experimental set (eg. including dry fruits/vegetables) in one online purchase. The website may be hosted on a server.

There is a problem that some chemicals are not allowed to be sold as a part of chemistry experimental sets. For example, European EN 71-4 standard for toys contains a list of chemicals that can be suggested in instructions but cannot be sold as a part of chemistry experimental sets. Users must buy such chemicals separately.

The solution that we have found is a website that sells chemistry experimental sets and when users buy the sets the website suggests adding additional chemicals to the shopping cart that are suggested in the instructions but not included in the chemistry experimental sets.

Such a website can offer the additional chemicals as:
An opt-in option to add all or some of the needed chemicals to the shopping cart
An opt-out option to add all or some of the needed chemicals to the shopping cart.

The goods can also be sold as a bundle that includes both the chemistry experimental set and a package of such additional chemicals.

These additional chemicals can be sold either by the same company that sells the chemistry experimental set or by a separate company. In the second case, shipping information and payment are sent from the website server to the seller's system.

6. Defocus Code System

There is provided a system of printable code and software that uses a camera to read the code that can even be read when the camera is not focused on this code. It is achieved by placing eg. less than 2 bytes of information in the code and designing it in a way that it is still readable after the blurring effect which happens when the camera is not focused.

There are existing technologies for 2D "barcodes" that can be recognized by a camera: eg. QRCode, Microsoft Tag, barcode, etc. The problem with these technologies is that they do not work well when the scanned code is not in the camera's focus. Placing such codes on small objects is problematic because a camera may not auto-focus well on small objects.

It is difficult to design a code system that can encode a large amount of data and be read by a camera without focusing. When the code is not in focus, most of the information is lost.

An idea is that if we design a code that encodes only a small (eg. only a very small) amount of information (eg. less than 2 bytes) we can achieve the effect that such a code is recognized even when the camera does not focus on the code.

Such an effect (recognizing the code without camera focusing) can be achieved, for example, by using large spots of easy to distinguish colors wherein such spots should be large enough that the color is recognized even if the picture is not in focus. Exactly or approximately circular spots are advantageous because even when out of focus, these may still appear exactly or approximately circular.

Figure 4:
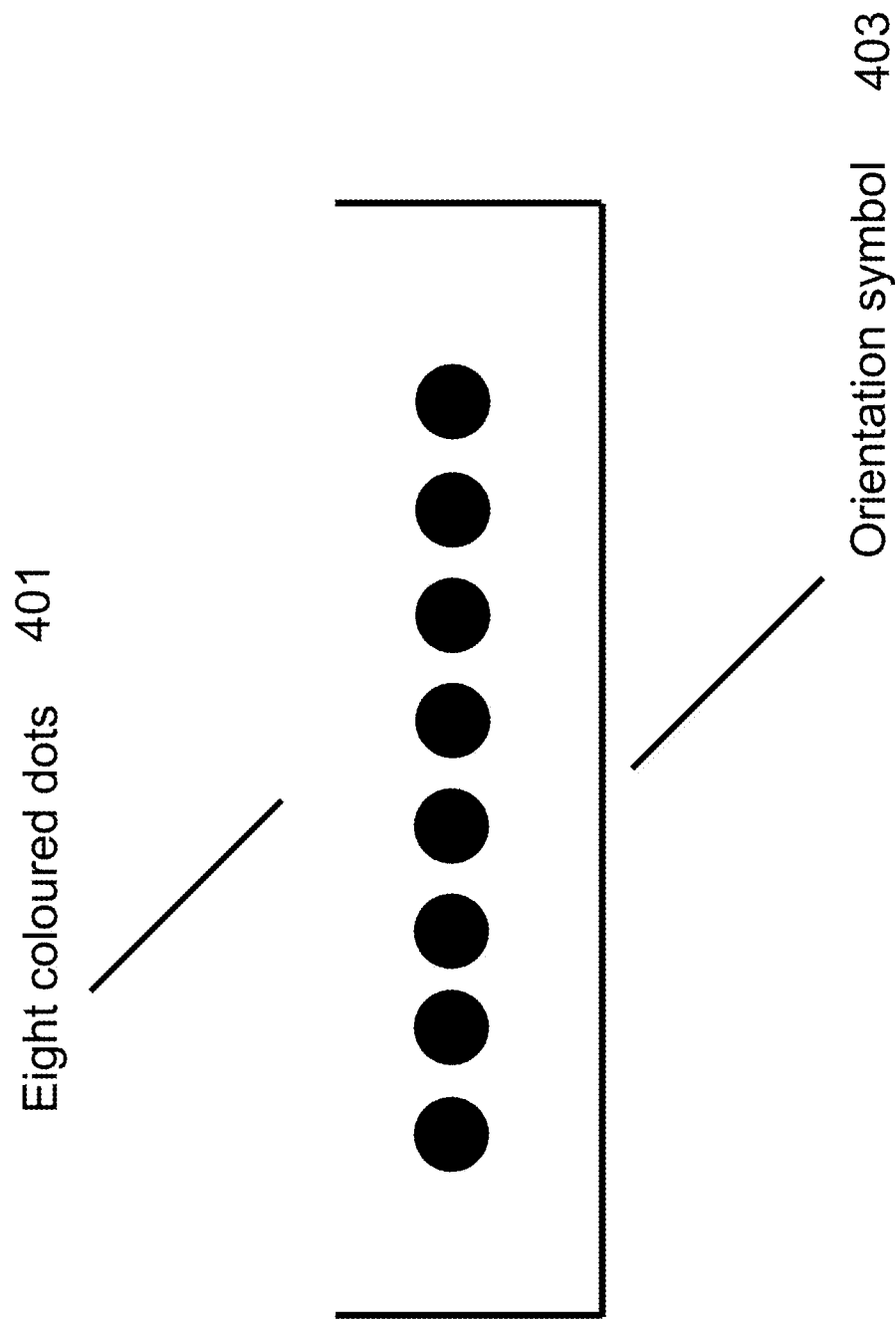
FIG. 4 shows an example of a code of eight dots provided with an orientation symbol which identifies which way up the dots should be read.

For Referring to FIG. 4, for example, eight spots 401 can be used, each taking the possible colours red, green, blue or black. Each spot therefore can provide 4 possibilities, and hence encodes 2 bits. Therefore eight spots encode $4^8=2^{16}$ possibilities, which is 2 bytes of information. However, there may still be issues regarding possible confusion. For example, if the eight coloured dots are provided as a line, the wrong code could be read if the code was read upside down. So the eight dots could be provided with an orientation symbol 403 which identifies which way up the dots should be read as provided in FIG. 4.

Figure 5:
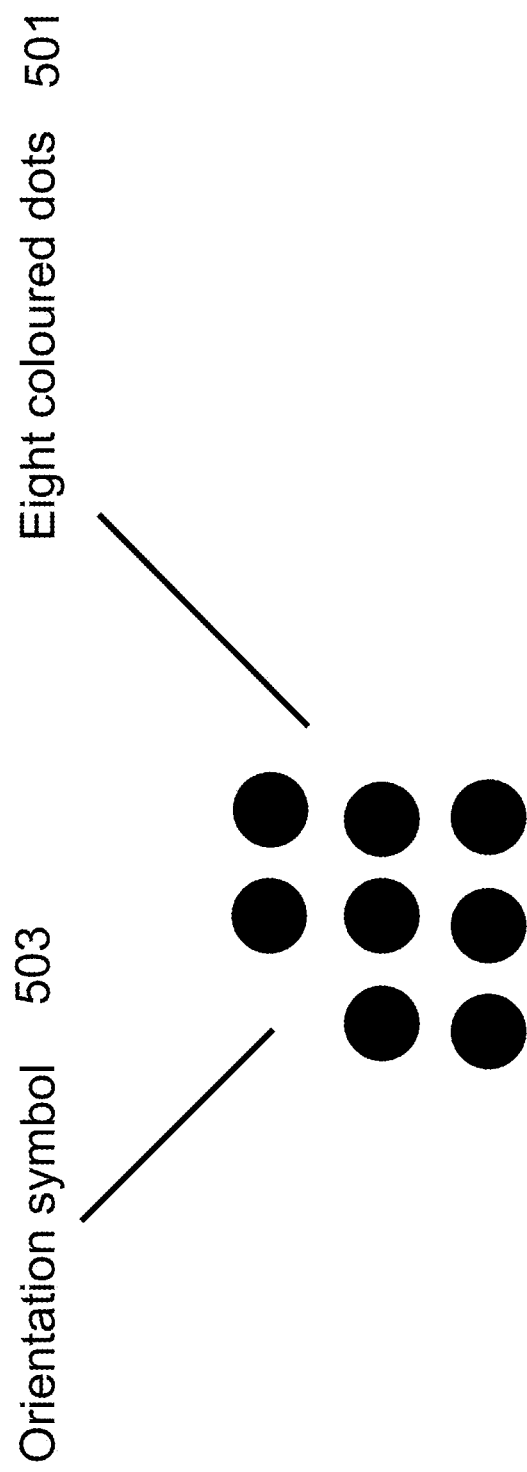
FIG. 5 shows an example in which eight coloured dots are provided in a 3×3 array, with the first dot missing, the missing dot acts as an orientation symbol.

In another example, eight coloured dots 501 could be provided in a 3×3 array, with the first dot in the array missing. The missing dot 503 then acts as an orientation symbol. See FIG. 5.

Figure 6:
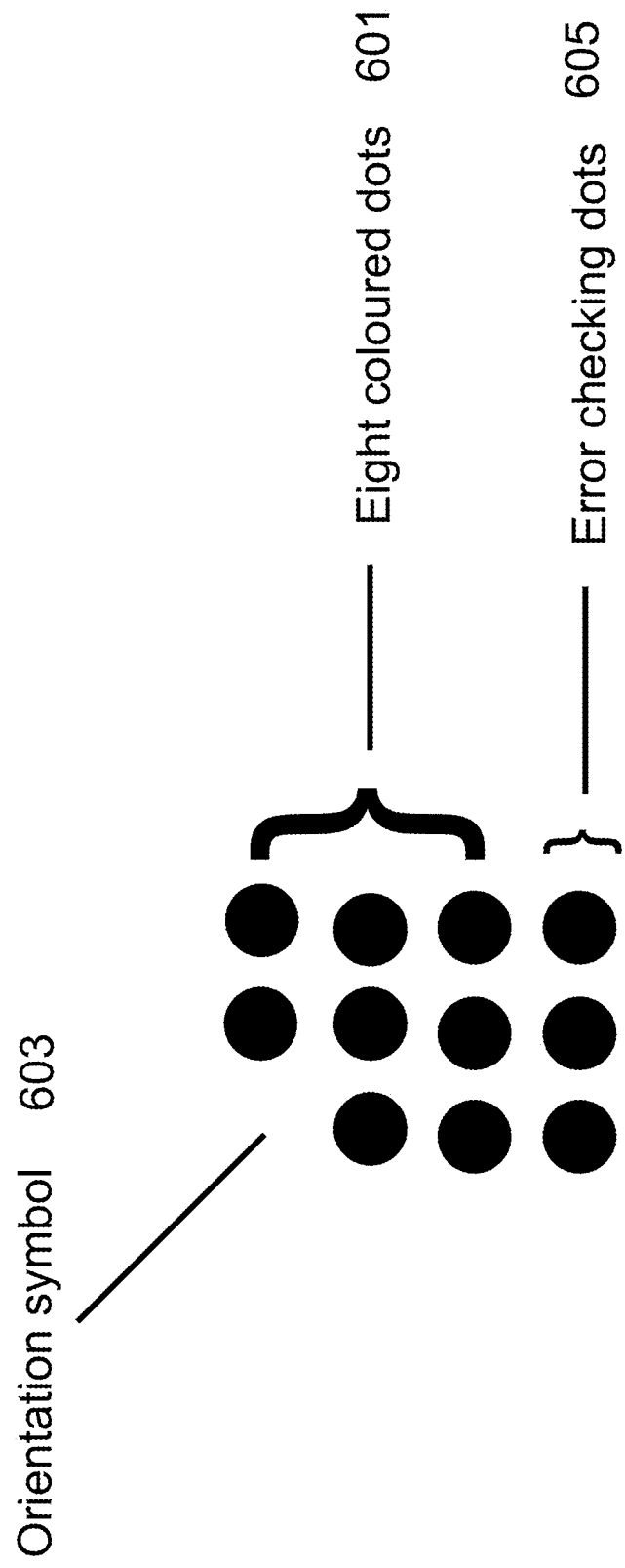
FIG. 6 shows an example in which eight coloured dots are provided in a 3×3 array, with the first dot missing; the missing dot acts as an orientation symbol, and in which three further dots are provided as an error checking code.
Figure 6:
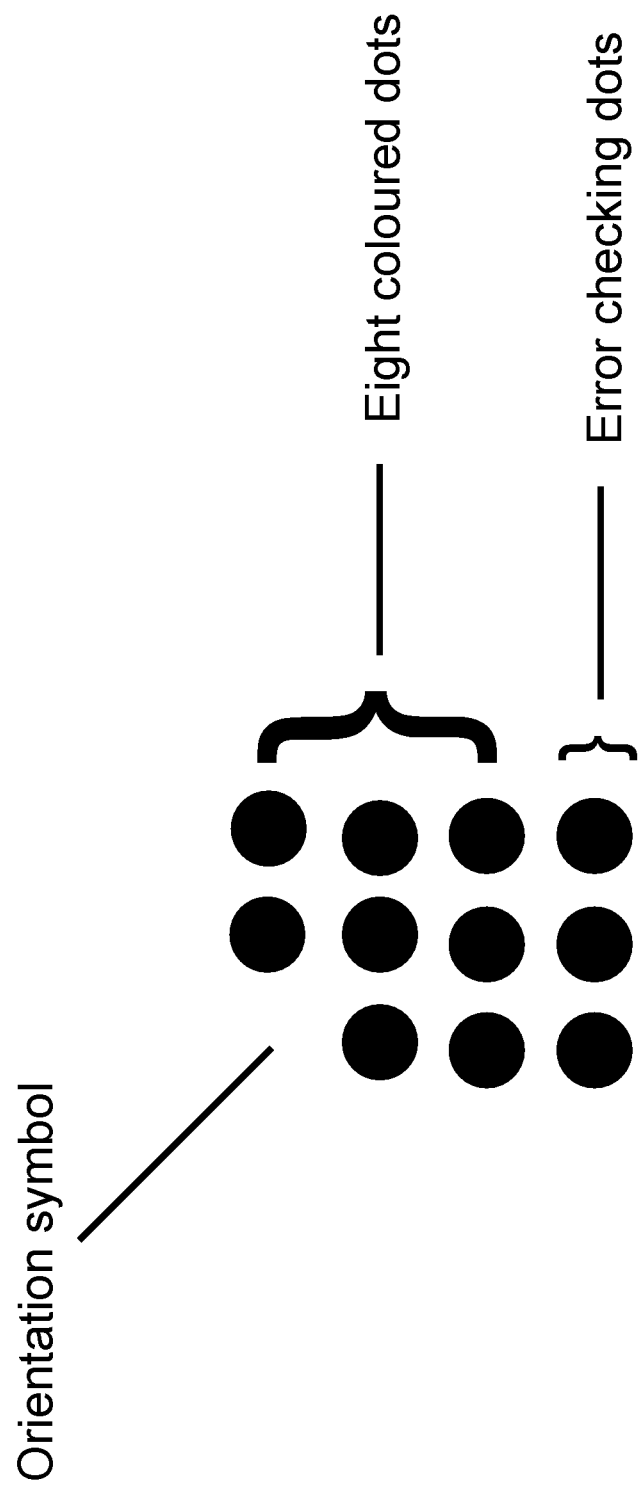
Figure 7:
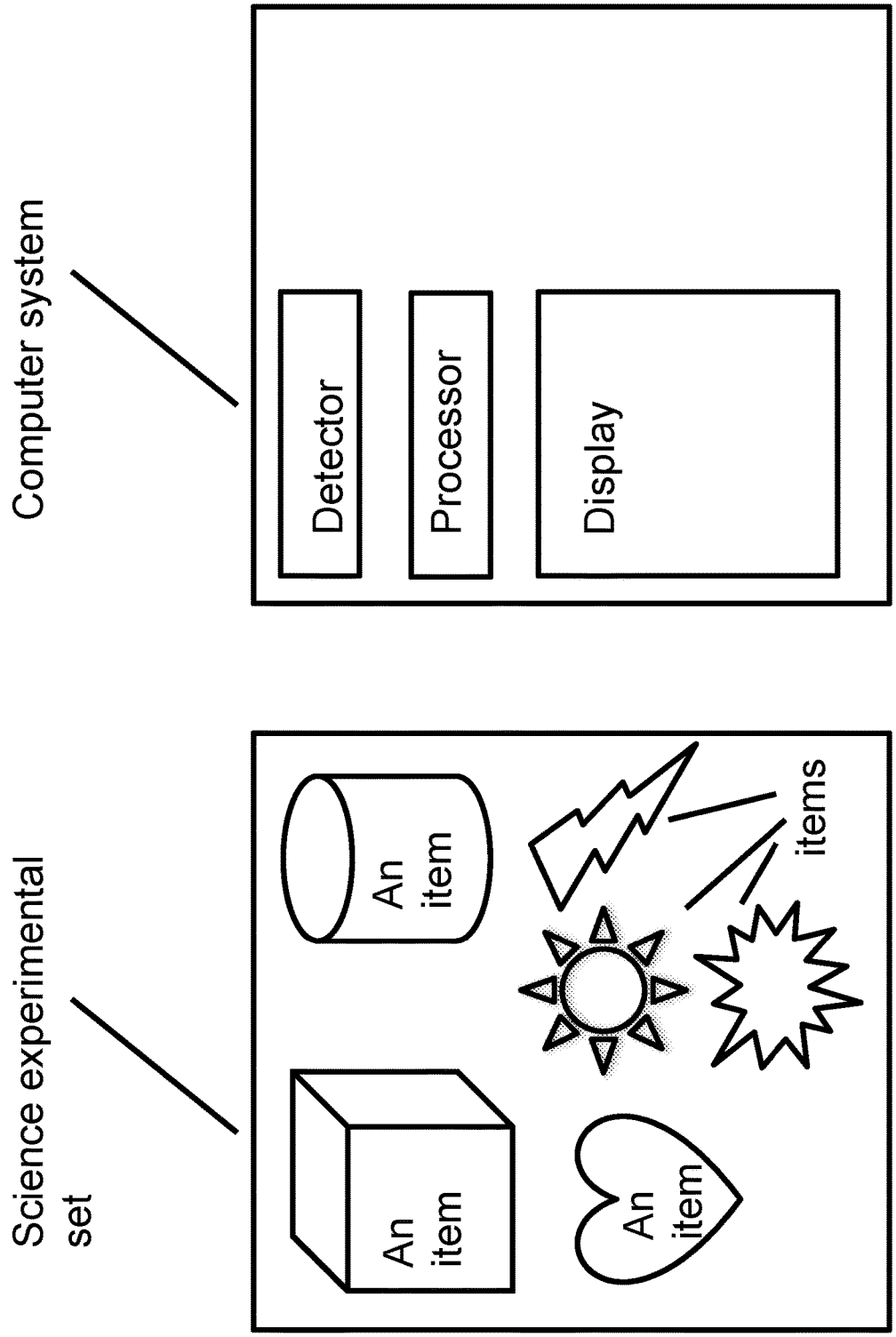
FIG. 7 shows a schematic example of an educational system including a science experimental set and a computer system, the science experimental set comprising experimental set items, and the computer system including a processor, a detector and a display, the computer system configured to display educational media content on the display relating to the science experimental set in response to the detector detecting an item in the science experimental set, and the processor identifying the media content to be displayed based on the detection of the item.

Further coloured dots may be provided as an error checking code. A simple example of an error checking code is a checksum. Other error checking codes are known. In a simple example, eight coloured dots 601 could be provided in a 3×3 array, with the first dot in the array missing. The missing dot then acts as an orientation symbol 603. Three further dots 605 are then provided as an error checking code. See FIG. 6.

In an example, there is provided a system of printable code and software that uses a camera to read the code that can even be read when the camera is not focused on this code. In an example, it is achieved by placing less than 20 bytes of information in the code and designing it in a way that it is still readable after the blurring effect which happens when the camera is not focused. In an example, it is achieved by placing less than 15 bytes of information in the code and designing it in a way that it is still readable after the blurring effect which happens when the camera is not focused. In an example, it is achieved by placing less than 10 bytes of information in the code and designing it in a way that it is still readable after the blurring effect which happens when the camera is not focused. In examples, it is achieved by placing less than 8 bytes, or less than 6 bytes, or less than 4 bytes, or less than 2 bytes, of information in the code and designing it in a way that it is still readable after the blurring effect which happens when the camera is not focused.

For example, spots can be used, each taking the possible colours red, green, blue or black. Each spot therefore can provide 4 possibilities, and hence encodes 2 bits. Therefore 80 spots encode $4^{80}=2^{160}$ possibilities, which is 20 bytes of information. Therefore 79 spots encode $4^{79}=2^{158}$ possibilities, which is less than 20 bytes of information. 79 spots could be provided in a 9×9 array, with the first two spots missing, so as to provide an orientation symbol. Error checking spots may be added. For example, a row of 9 spots can be added, encoding an error checking code (eg. a checksum). The error checking row of 9 spots may be provided at the bottom of the 9×9 array, for example.

7. One Time Use Liquid Reagents

A chemistry experimental set in which some of the reagents are provided in liquid form in one time use disposable containers.

8. Chemistry Experimental Set with Reagents Measured in Moles

A chemistry experimental set in which some or all of the reagents are provided in containers that allow a user to easily take out the needed amount in moles.

For many chemistry reactions, measuring the reagents in moles makes much more sense than in grams.

An idea is to make a chemistry experimental set where it is easy to take the needed amount of moles of the needed reagent.

There are several ways to do so, including:
By placing reagents in small containers it is assumed that a user will use all of the reagent from the container. And possibly write down on the container the amount of reagent in moles. Or the amount of reagent in moles is shown on the container.
Providing the reagents in countable pieces like tablets or capsules. And possibly write down the amount of reagent in moles in one such piece. Or the amount of reagent in moles in one piece is shown on the container.
Providing the reagents as solutions with the given molar concentration in containers that allow for a user to easily dispose of (or use) the given volume thus knowing the concentration it will give for the needed amount in moles.

9. Thin Experimental Set

There is provided an experimental set in a thin design (eg. <22 mm thick) that can be sent by a delivery service (eg. by post) as a large letter.

Creating thin boxes for chemistry experimental sets has at least two important advantages:

Such a package can be put in a letter box

Such a package can be sent as a large letter (post in many countries have a special tariff for thin boxes that are recognized as large letters).

In order to achieve it all, components of the chemistry experimental set should have at least one dimension less than a certain size that could depend on the country and which is usually in the range 20-22 mm. If the chemistry experimental set is split up into a series then all big components can be put in one bigger package that does not have the above mentioned advantages of a thin package, but all later experimental sets in the series could be supplied in thin boxes.

10. Chemistry Experimental Set with a Tablet Device

A chemistry experimental set is provided that comes with a pre-integrated tablet device that is used for example to show experiment instructions, video instructions, visualize chemical reactions on a molecular level, automate the experiment, or read measurements from the detectors.

A chemistry experimental set can come with a companion application. Although a user can be offered or permitted to install this application to his/her device there are advantages of including a computer device with a touch screen as a part of the package. Such integration may give many advantages, including, for example:

No configuration is needed: the application is already preconfigured and is ready to use on the tablet device.

Integration with sensors and the measuring tools that could be included in the chemistry experimental set.

Preloading a large number of videos or data for the application on the tablet device.

Such a tablet device can be mounted to the chemistry experimental box thus having an optimal position for using it.

The tablet device can be a customized device with additional sensors (like a bar code reader, etc.) and the software can take advantage of these sensors.

11. Scales in Moles

There are provided scales that can measure weight not in grams but in moles. The scales "know" what substance is measured and recalculate the weight in moles using substance molar mass information. This can be done using either a computer readable code on a substance container or by entering manually what substance is being weighed. The scales include, or have access to, a sensor which senses the computer readable code. For example, the scales include, or have access to, a camera which scans the computer readable code.

12. Chemistry Experimental Set with a Reminder System that Reminds a User to Perform an Experiment There is provided a chemistry experimental set that comes with a system that reminds users (eg. by SMS, email, app notification, etc.) to perform the next experiment. Chemistry experimental sets may contain many experiments. A typical problem with such chemistry experimental sets is that people use only a few experiments and then forget about them.

A chemistry experimental set is provided that has a reminder system. This reminder system can be implemented, for example, as:

An online service that reminds users per SMS

An online service that reminds users per email

A mobile application that reminds using the mobile device (eg. smartphone) notification system The reminders could be based on different rules, for example:

User-defined schedule

Weekly

Monthly

When a new experiment become available in the online system.

The reminder can also include additional information about the experiments including for example detailed experiment description, photos, pictures, or video.

There could be separate reminders sent to parents and children, for example.

13. Chemistry Experimental Set with a Molecule Constructor Set

A chemistry experimental set that comes with details to construct molecules from atoms.

It is important for people who want to understand chemistry to understand molecular structures. For many people one of the good ways to understand and remember is constructing molecules from atoms using physical details.

We suggest adding to chemistry experimental sets plastic balls and sticks that can be used to construct models of molecules from atoms.

14. Augmented Reality Chemistry Experimental Set

There is provided software that combines a chemical reaction simulation and visualization algorithms with augmented reality to present the results over the physical world or over a camera feed. For example a head mounted display may be used to display the presented results. The head mounted display may be partially transparent so as to present the results over the physical world. The head mounted display may receive a camera feed, so as to present the results over the camera feed.

Some interesting chemical reactions cannot be included in chemistry experimental sets for a number of reasons, such as:

A reaction is too dangerous

The needed reagents are not allowed to be included in chemistry experimental sets The needed reagents are too expensive Such reactions can be simulated using different chemistry reaction simulation algorithms such as molecular dynamics simulations and quantum chemistry calculations.

We suggest visualizing the results of reaction simulation using augmented reality technology (eg. using a head mounted display, eg. using a head mounted display which is partially transparent) eg. when the results are placed over the real time video stream from a camera thus creating an effect that this reaction is actually happening next to a user in real life, or eg. when the results are placed on a partially transparent head mounted display thus creating an effect that this reaction is actually happening next to a user in real life.

The software can also use video from a camera to provide an input of information of what reagents are selected. This can be achieved by creating and using reagent containers recognizable by a camera (eg. using special codes or using containers with distinguishable looks).

15. Virtual Chemistry Experimental Set

There is provided an online website, PC software, or a mobile app that combines chemical reaction simulation with visualization algorithms.

There are several situations when a virtual chemistry experimental set has advantages over a real one, including:

virtual chemistry experimental set can show reactions that are dangerous

Virtual chemistry experimental set is cheaper virtual chemistry experimental set is easier to distribute It takes less time to perform an experiment with a virtual chemistry experimental set virtual chemistry experimental set can be used in situations where a real chemistry experimental set cannot be used for legal reasons.

We suggest creating a virtual chemistry experimental set that combines various reaction simulation algorithms that predict how a chosen reaction will happen and then to visualize this reaction.

Such a virtual chemistry experimental set can be implemented as:

Website

Software for PC

Mobile application for smartphones or tablets

Such a virtual chemistry experimental set allows the user to simulate the behavior of a real chemistry experimental set:

Choosing reagents from the list of reagents

Mixing reagents in different containers

Choosing reaction conditions (temperature, light, etc)

In addition, a virtual chemistry experimental set could be linked with real chemistry experimental sets. In that case, the virtual chemistry experimental set uses a camera or another sensor to detect what reagents are taken and simulate the same situation (eg. reaction) as in the real world. Some reagents in the real chemistry experimental set can be replaced with empty containers with a recognizable code. In that case, these containers are used as an instruction for the virtual chemistry experimental set for which the reaction is simulated and shown.

16. Experiment Stickers

There is provided a chemistry experimental set with stickers for each or some experiments. These stickers are used as a reward for users (eg. children) for conducting an experiment.

Children like fast rewards. So it could be a good idea, in addition to explaining to them the usefulness of learning chemistry and understanding how nature works, to provide other ways to reward them for conducting experiments. One such reward system can be stickers that are included in a chemistry experimental set.

We suggest creating a chemistry experimental set that includes stickers for each or some of the experiments. The instructions explain that after a user has conducted an experiment the user can take the corresponding sticker and place it somewhere.

The stickers could include some information about the experiment such as:

Experiment name

Experiment number

An experiment photo

Name/photo/structure of used reagents

Name/photo/structure of resulting chemical

Alternatively, such stickers could be designed as magnets to be mounted on a metallic surface like a refrigerator surface.

In addition, the chemistry experimental set can include a special surface for placing the stickers. It can be a poster design to be mounted on a wall or a special page in the instructions, for example. Such a surface could include designed places for all the stickers and thus motivate the user to conduct all the experiments.

An alternative solution could be providing one surface with special areas that a user can scratch to indicate that the experiment is done.

17. Photo/Video Studio in a Chemistry Experimental Set

There is provided a chemistry experimental set that is optimized to help users (eg. children) to shoot better experiment videos eg. by including lenses, smartphone/tablet/camera holder, background, or lighting.

People like sharing videos but creating a good video is difficult. We suggest creating a chemistry experimental set that will be specially designed to help users to create better experiment videos. The following may be included, for example:

Providing a detailed guide on how to shoot better experiment videos

Including lenses designed to be used with a smartphone or a tablet device in the chemistry experimental set Including a smartphone/tablet/camera holder in the chemistry experimental set Including a light system in the chemistry experimental set Using the chemistry experimental set box as a smartphone/tablet/camera holder Including a smartphone/tablet/camera holder in the chemistry experimental set Including a special background for the video.

In addition, we suggest including with a chemistry experimental set access to a special mobile application for portable or mobile devices (eg. smartphones or tablet devices) that is designed to help shooting experiment videos. Such software could include the following features:

Shooting time lapse video

Video editing

Adding molecule 3D structures to the video

Adding experiment information to the video (eg. experiment name, reaction formula, reagents names and chemistry formulas, etc)

18. Tray

There is provided a plastic tray included in a chemistry experimental set that is big enough to conduct experiments on that tray (eg. it helps to avoid spilling).

As one of the possible options to make such a tray, the chemistry experimental set box could be designed to work as a tray.

19. Matrix

There is provided a chemistry experimental set with a plastic detail that has an N*M matrix of volumes integrated in one piece. It can be an N*M set of holes in a plastic tray.

Some of the chemistry experiments require mixing many reagents with each other. It may be better done not in test tubes but in a special container that includes a matrix of N*M holes 101 as shown in FIG. 1.

20. Embedded Volumes

Figure 2:
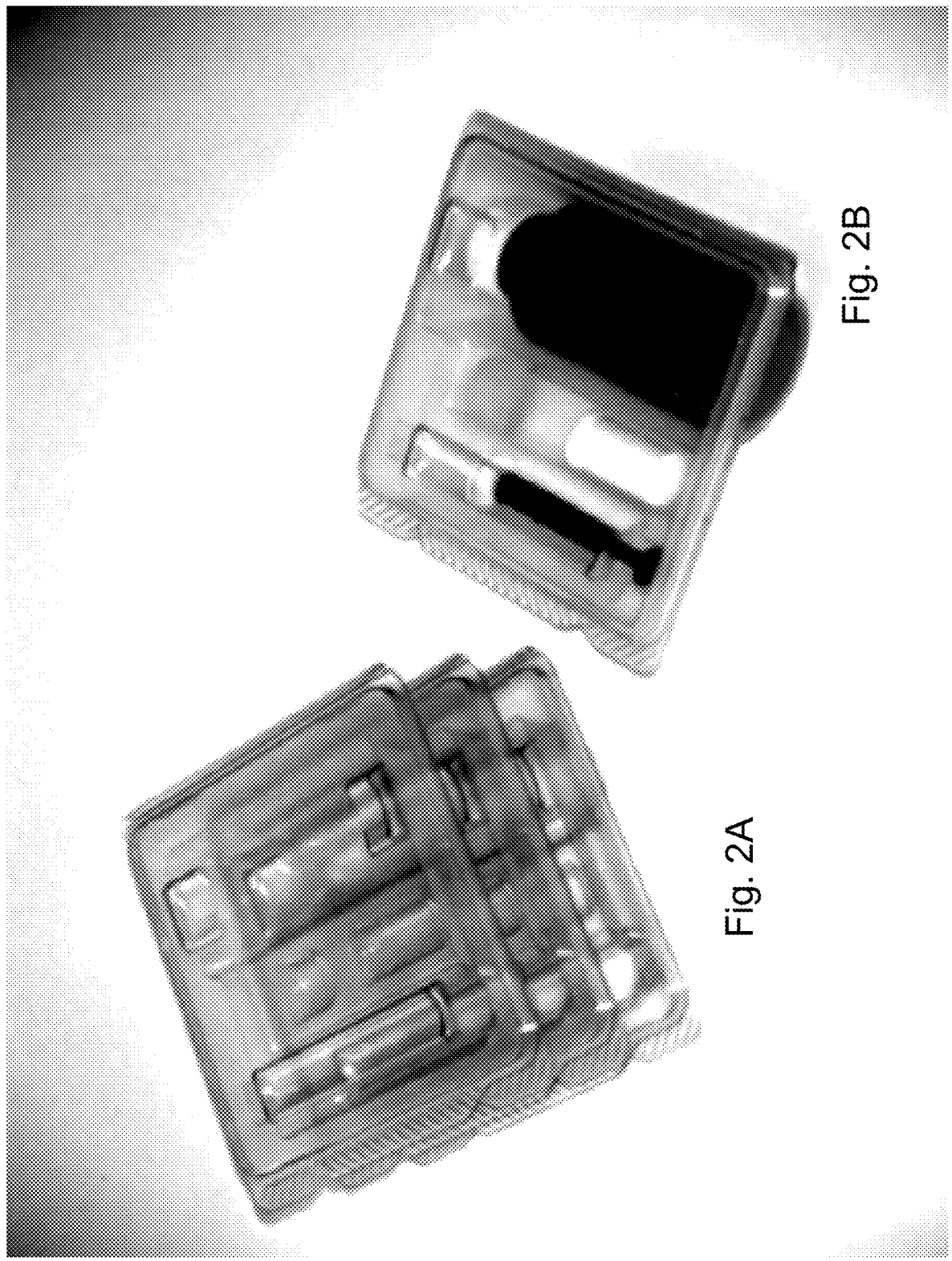
FIGS. 2A and 2B show examples of a plastic tray that has pressed holes of different forms to make experiments in these holes as in tanks.
Figure 3:
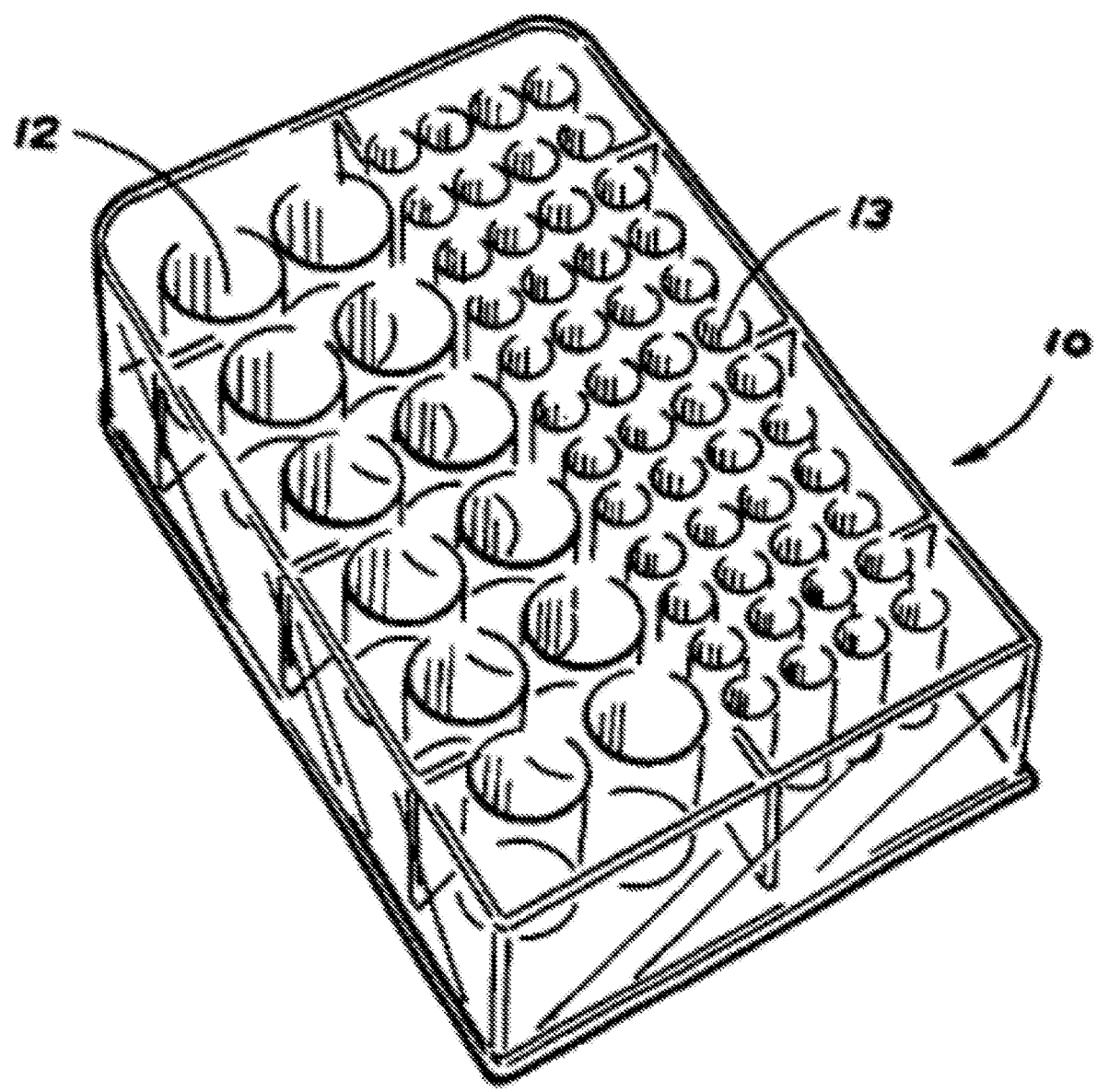
FIG. 3 shows a prior art figure disclosed in GB2319111(A) and GB2319111(B).

There is provided a chemistry experimental set with a plastic tray that has pressed holes 201 of different forms to make experiments in these holes as in tanks (see FIGS. 2A and 2B).

An idea is that instead of providing different flasks, glasses, and test tubes, all the needed containers are provided in one or several trays eg. using thermoformed plastic technology.

This can be done for example using the same technology that is used for blister packages or using thermoformed packaging technology. Examples are shown in FIGS. 2A and 2B as discussed above.

21. Chemistry Experimental Set with Secret Writing on the Box

There is provided a chemistry experimental set with secret labels or pictures on the package that can only be seen after some additional actions eg. heating, adding some special liquid, exposing to a special light, etc. There is provided a chemistry experimental set with labels or pictures that disappear or change after some additional actions like heating, adding some special liquid, exposing to a special light, etc.

People like chemistry for its magical effects. One category of such magical effects is labels that either appear or disappear or change when a user does something particular to them. They are often known as "disappearing inks", "secret messages", "spy inks", etc. The effects could include:

Disappearing inks: writing or a picture that will disappear itself after some time Writing or a picture that can only be seen in ultraviolet light Writing or a picture that will become visible or change color after heating Writing or a picture that will become visible or change color after cooling down Writing or a picture that will become visible or change color when some special liquid is added We suggest adding such labels on the chemistry experimental box or the instruction booklet. We suggest adding such labels on the chemistry experimental box or the instruction booklet to the places where people do not usually expect to find them. So finding these secrets make a nice surprise.

22. Parent Notification System

There is provided a chemistry experimental set with a special system that notifies parents that their children have finished an experiment. Such a system can use a signal eg. from a mobile application, a website or built-in sensors, and notify parents eg. via email, SMS, mobile push notification, or a phone call.

Fast award helps children's motivation. Reward from parent is even more valuable and it is important that it comes fast. We suggest making a system that allows parents to know in real time that their children have successfully conducted an experiment. It makes sense for parents to come to their children and immediately congratulate the child with this success.

The system consists of two parts: one that receives information that an experiment is done and another that notifies parents about that.

Information that the experiment is done can be obtained using one of many ways including.

Website or a mobile application where children upload a video about the conducted experiment or post a link to the video uploaded in a third-party system eg. YouTube Website or a mobile application where children pass a test after an experiment is done An electronic device integrated in the chemistry experimental set or a mobile application that understands that an experiment is done (using sensors like camera or through user input).

23. Chemistry Experimental Set Subscription Service with Spare Boxes

There is provided a chemistry experimental set subscription service consisting of one initial set and additional sets sent eg. on a regular basis (eg. weekly or monthly) where the initial set contains one or several spare additional sets.

Subscriptions services have many advantages but if the boxes are sent by post, there is a chance that one of the many boxes is lost or delayed. Then customers are disappointed.

We offer to create a chemistry experimental set subscription service that consists of one initial box that is sent just after subscription and additional boxes that are sent eg. on a regular basis. We suggest including one or several spare additional boxes in the initial set that are marked as spare boxes. And we recommend users to use these spare boxes in case an expected box is not delivered for some reason.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. An educational system including a chemistry experimental set and a computer system, the chemistry experimental set comprising experimental set items including a reagent container containing a reagent, the reagent container including a symbol, a code, or a computer recognizable label, and the computer system including a processor, a detector and a display, the computer system configured to display educational media content on the display relating to the chemistry experimental set in response to the detector detecting the reagent container in the chemistry experimental set, and the processor identifying the media content to be displayed based on the detection of the reagent container, wherein the detecting includes identifying the symbol, the code, or the computer recognizable label, on the reagent container.

2. The educational system of claim 1, wherein the detector includes a camera, and wherein the detecting includes recording an image relating to the reagent container.

3. The educational system of claim 1, wherein the detector includes a plurality of cameras, and wherein the detecting includes using the cameras to detect the reagent container.

4. The educational system of claim 1, wherein the detecting includes detecting the reagent container itself using image recognition algorithms.

5. The educational system of claim 1, wherein the detector includes a wireless detector, and wherein the detecting includes detecting a wireless signal from the reagent container.

6. The educational system of claim 5, wherein the wireless detector is a near field scanner or an ultra high frequency radio frequency identification detector.

7. The educational system of claim 1, wherein the media content is one or more of: text, graphics, video, audio, animation or pictures.

8. The educational system of claim 7, wherein the video media content is an experiment video.

9. The educational system of claim 1, wherein the media content provides one or more of the following features:
 (i) visualization of a molecule's 3D structure; or (ii) showing molecular structure using different models ("balls and sticks", "balls", etc.); or
 (iii) allowing to rotate, zoom in/zoom out to explore the molecule structures; or
 (iv) visualization of molecular dynamics; or
 (v) visualization of the change of different parameters during the reaction using graphs and charts; or
 (vi) visualization of electron orbitals in the atom and molecules; or
 (vii) controlling reaction visualization speed and scale; or
 (viii) controlling controllable devices included in the chemistry experimental set (eg. controlling the temperature of a heater, controlling to open a valve to let a liquid flow through the valve); or (ix) reading information from the measurement devices included in the chemistry experimental set (e.g. scales, thermometer, etc.) and presenting this information in a visual way.

10. The educational system of claim 1,
(i) wherein the media content provides a dynamic experiment description; or
(ii) wherein the item is a user manual, an experiment description, experiment instructions, an experiment photo or a chemistry experimental set box; or
(iii) wherein the item is a static experiment description, and in which the media content is a dynamic experiment description; or
(iv) wherein the computer system includes a portable device, or
(v) wherein the computer system includes a smartphone, tablet computer, laptop computer, desktop computer or a TV computer.

11. The educational system of claim 1, wherein the computer system includes an augmented reality system including a headset including the display.

12. The educational system of claim 11, using augmented reality technology to recognize one or several reagent containers in a video stream and add additional information about the reagent or reagents directly to the video, which is displayed on the display.

13. The educational system of claim 12, wherein the additional information is one or more of:
(i) chemical formula; or
(ii) molecule 3D structure; or
(iii) crystal structure; or
(iv) some text data including parameters such as the reagent mass, density, melting point, etc.

14. The educational system of claim 1, wherein the computer system shows on the display the molecular structure of the reagent.

15. The educational system of claim 14, wherein a software application running on the processor first shows a reagent container and then zooms in on it to show the molecules; such an effect helps a user to understand that the shown molecule is actually what is inside the reagent.

16. The educational system of claim 1, wherein a software application running on the processor is preinstalled to the computer system, or is downloadable to the computer system.

17. A kit of parts comprising a chemistry experimental set and a software application, the chemistry experimental set comprising experimental set items including a reagent container containing a reagent, the reagent container including a symbol, a code, or a computer recognizable label, the software application executable on a computer system, the computer system including a processor, a detector and a display, the computer system operable to execute the software application on the processor to display educational media content on the display relating to the chemistry experimental set in response to the software application executing on the processor detecting the reagent container in the chemistry experimental set, and the software application executing on the processor identifying the media content to be displayed based on the detection of the reagent container, wherein the detecting includes identifying the symbol, the code, or the computer recognizable label, on the reagent container.

18. A method of displaying educational media content on a display, the educational media content relating to a experimental set, the method comprising the steps of:
a detector detecting a reagent container in the chemistry experimental set, wherein the detecting includes identifying a symbol, a code, or a computer recognizable label, on the reagent container;
(ii) a processor identifying the educational media content to be displayed based on the detection of the reagent container, and
(iii) a computer system displaying the educational media content on the display, the educational media content relating to the chemistry experimental set, in response to the detector having detected the reagent container in the chemistry experimental set.

19. A computer program product executable on a processor of a computer system including the processor, a display and a detector, the computer program product executable on the processor of the computer system to:
detect using the detector a reagent container in a chemistry experimental set, wherein the detecting includes identifying a symbol, a code, or a computer recognizable label, on the reagent container;
(ii) identify educational media content to be displayed based on the detection of the reagent container, and
(iii) display on the display the educational media content, the educational media content relating to the chemistry experimental set, in response to the detection of the reagent container in the chemistry experimental set.

* * * * *